G. A. MEYERS.
DISTRIBUTER.
APPLICATION FILED DEC. 1, 1917.

1,278,366.

Patented Sept. 10, 1918.
3 SHEETS—SHEET 1.

Inventor
Gustav A. Meyers,

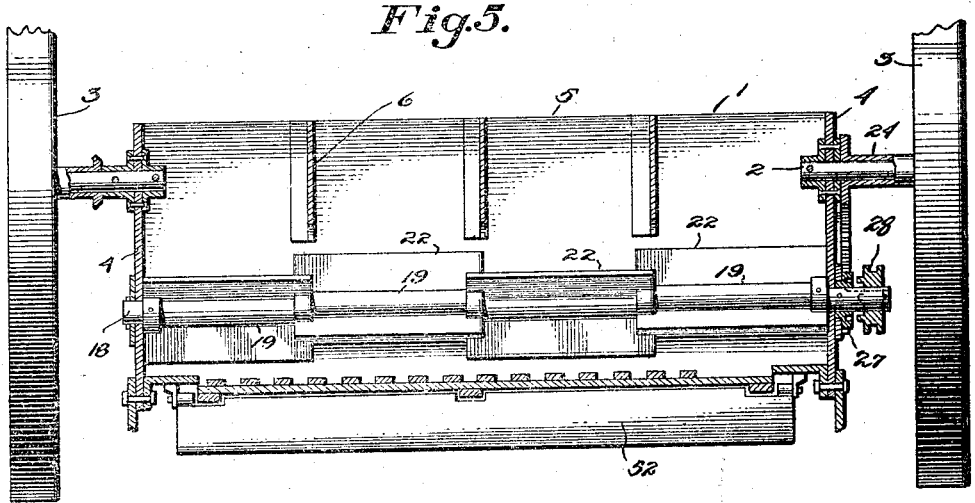
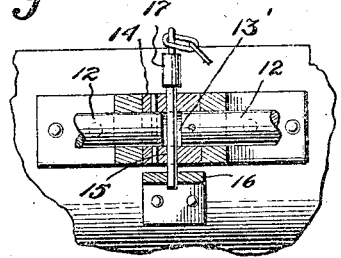
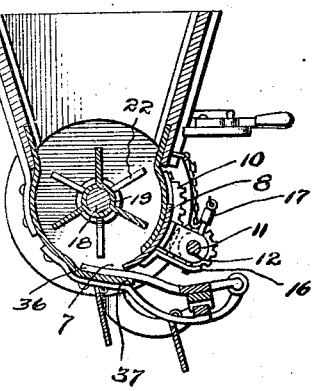
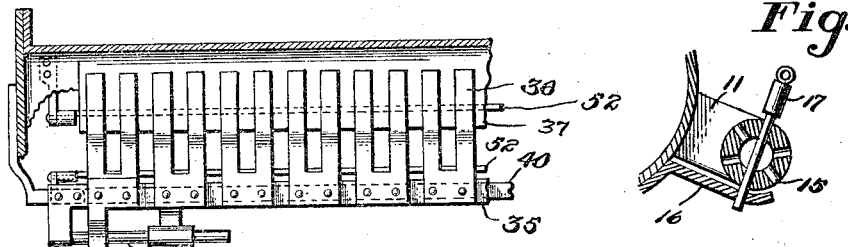

UNITED STATES PATENT OFFICE.

GUSTAV AUGUST MEYERS, OF PAAUILO, TERRITORY OF HAWAII.

DISTRIBUTER.

1,278,366.

Specification of Letters Patent.

Patented Sept. 10, 1918.

Application filed December 1, 1917. Serial No. 204,811.

*To all whom it may concern:*

Be it known that I, GUSTAV AUGUST MEYERS, a citizen of the United States, a resident of Paauilo, Hawaii, Territory of Hawaii, and whose post-office address is Paauilo, Hawaii, have invented certain new and useful Improvements in Distributers; and I do hereby declare the following to be a full, clear, and exact description of the invention, such as will enable others skilled in the art to which it appertains to make and use the same.

This invention relates to a distributer which is particularly designed for the spreading of lime, but which is equally well adapted for the spreading of various other substances of similar characteristics.

The primary object of the invention resides in the provision of a device of the above mentioned character, which is operative to distribute the material and to spread it evenly over the ground.

A further object of the invention resides in so constructing the device that the amount of material to be distributed may be varied at the will of the operator.

A still further object of the invention resides in so constructing the device that it may be attached to and drawn behind a vehicle or may be drawn alone.

With these and other objects in view, such as will appear as my description progresses, my invention comprises the combination and arrangement of parts as set forth in and falling within the scope of the appended claims.

In the drawing:—

Fig. 5 is a vertical longitudinal sectional view.

Fig. 6 is a transverse vertical sectional view.

Fig. 7 is a horizontal fragmental sectional view disclosing the spreader fingers.

Fig. 8 is a detail of the slide lock.

Fig. 9 is a similar view looking at right angles to Fig. 8.

Figure 1:
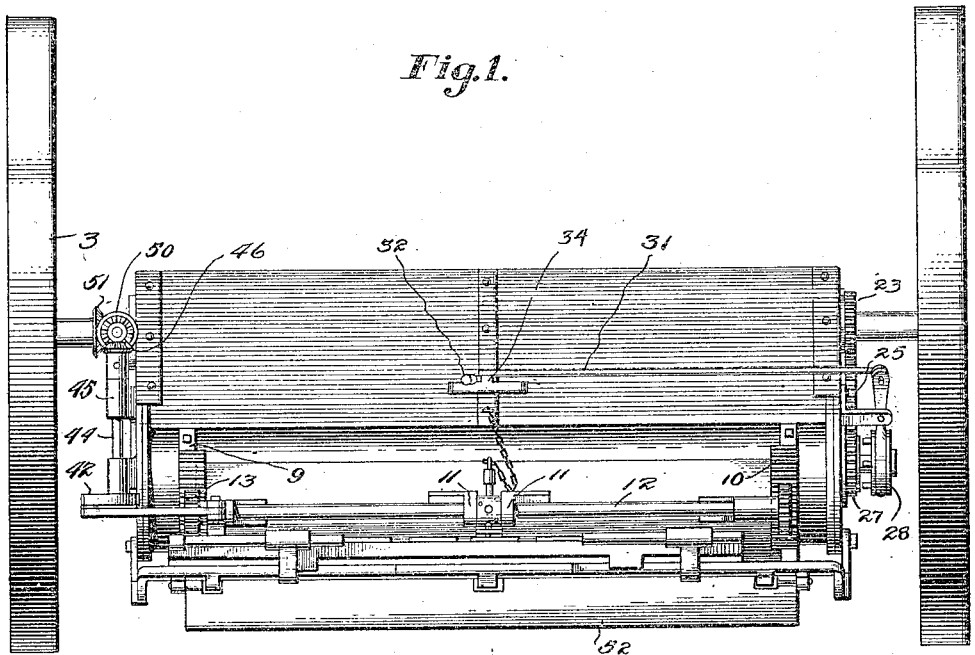
Figure 1 is a rear elevation of a distributer constructed in accordance with my invention.
Figure 2:
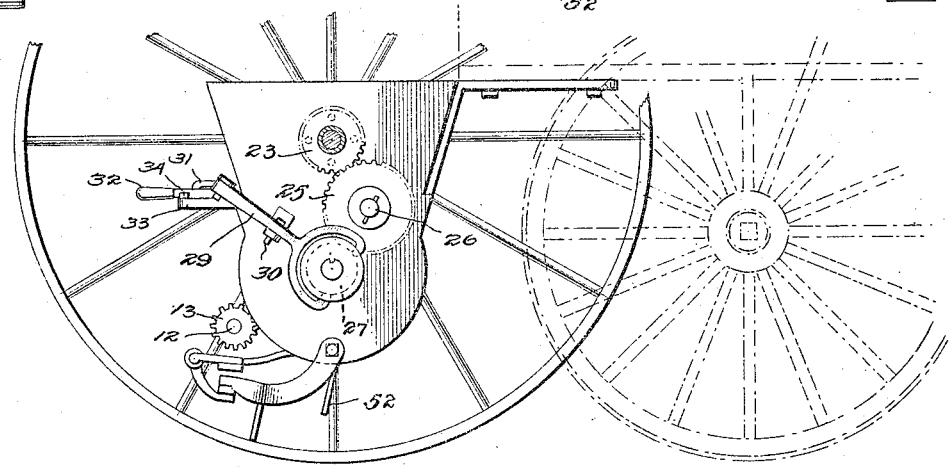
Fig. 2 is a fragmental sectional view looking at the clutch side and showing the relation of the distributer to the vehicle.
Figure 3:
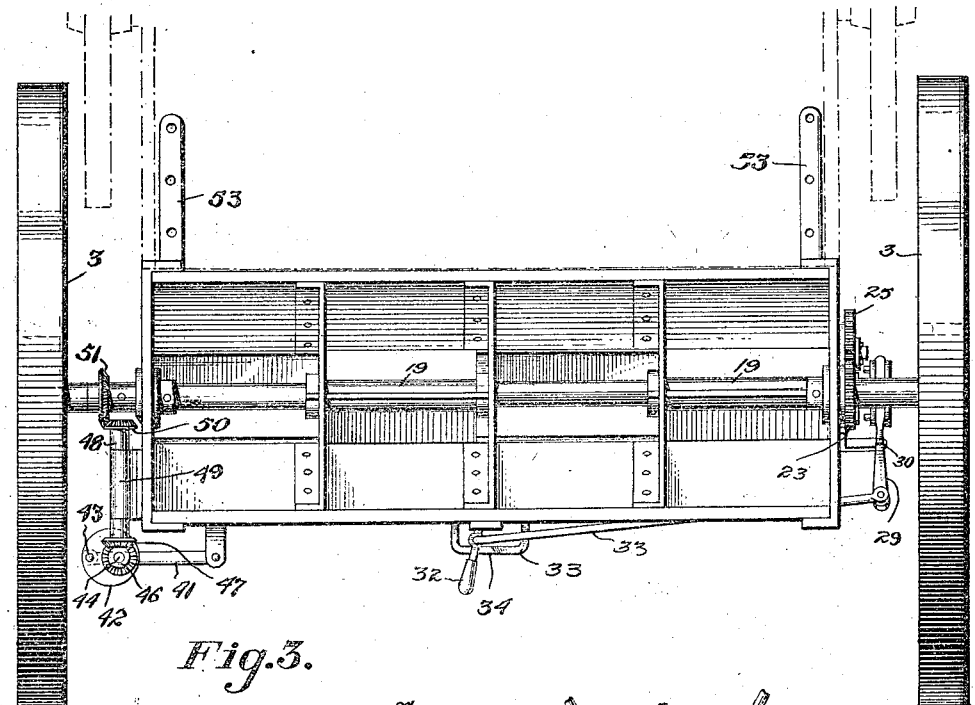
Fig. 3 is a plan view of the distributer.
Figure 4:
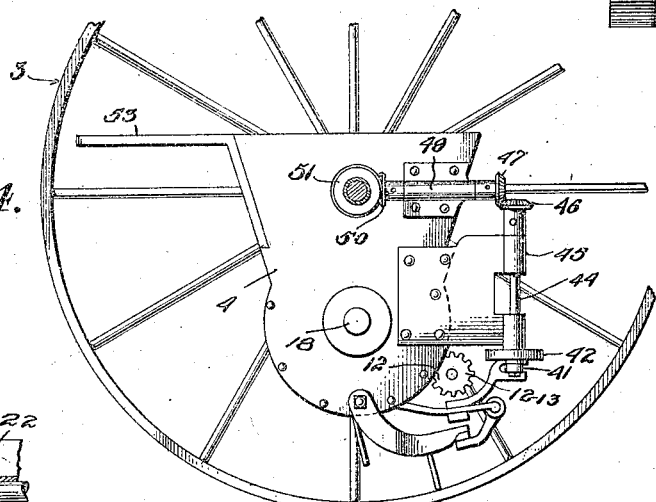
Fig. 4 is a fragmental section looking at the opposite side of the distributer to that disclosed in Fig. 2.
Figure 10:
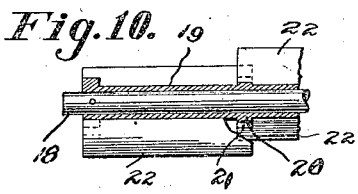
Fig. 10 is a fragmental sectional view disclosing the manner in which the agitator blades are mounted on the shaft.

The embodiment of the invention illustrated includes a hopper 1, from the ends of which spindles 2 extend. The wheels 3 are rotatable on these spindles and support the hopper in an operative position.

The hopper 1 is provided with parallel ends 4 and downwardly converging sides 5, between the latter of which partitions 6 extend, dividing the hopper into compartments. These partitions do not extend completely to the lower end of the hopper so that space is left for the agitator, which will later be described. The bottom of the hopper is open as at 7, and the effective width of this opening may be varied by means of a slide 8, which is operable in guideways 9 formed beneath segmental racks 10, which racks are secured to one side of the hopper.

In order that this slide may be held in any of its adjusted positions there are secured to the slide, a plurality of brackets 11 in which a shaft 12 is rotatably mounted. The ends of the shaft carry pinions 13 which intermesh with the teeth of the racks 10. Thus when the shaft is rotated, the rotation of the pinions on the racks will either raise or lower the slide 8 and consequently narrow or widen the opening in the bottom of the hopper. Between the intermediate brackets the shaft 12 is divided, leaving a space 13′, and secured to the ends of the sections of this shaft is a collar 14, which has a plurality of openings 15 extending therethrough, as clearly illustrated in Fig. 9. Arranged beneath the collar 14 is an apertured lug 16, which is secured to the slide 8 and is therefore movable therewith. The aperture in this lug is adapted to register with one of the openings 15 in the collar 14, and to receive a pin 17 which is inserted through the openings and into the aperture so as to prevent the rotation of the collar with relation to the slide on which the shaft is mounted. In this construction it will be seen that after the shaft has been rotated to bring the slide 8 into the proper adjusted position, the pin 17 may be inserted through one of the openings in the collar 14 and into the aperture in the lug 16, and inasmuch as the shaft will at this time be prevented from rotating, the coöperation of the pinions and the racks will lock the slide in its adjusted position. In order that the material may be agitated and forced from the bottom thereof, I have mounted a suitable agitator within the hopper, which extends longitudinally thereof and consists of a shaft 18 on which is a sleeve 19. This sleeve is provided with a plurality of spaced enlargements or collars 20 which have slots 21 therein; agitator blades 22 extend in the general direction of the axis of the shaft 18 and have their ends disposed and held in the slots 21. These blades 22 are arranged in staggered relation, as illustrated in Fig. 5, and the direction of rotation of the agitator is such that the material will be forced downwardly and from the bottom of the hopper.

In order that the advance of the distributer on the wheels 3 may cause the rotation of the agitator, I have mounted a gear 23 on one of the spindles 2, which gear is provided with a sleeve, and through this sleeve is made rigid with the adjacent wheel 3. This gear 23 intermeshes with a similar but larger gear 25, which is mounted on a stub shaft 26 and intermeshes with a gear 27 which is loosely mounted on the shaft 18. This latter gear 27 is, however, provided with a clutch element which is adapted to coöperate with complemental element 28, which is longitudinally movable on the shaft but rotatable therewith. The position of this clutch member 28 is controlled by a lever 29, which is pivoted at 30 on the adjacent end of the hopper and is actuated by a rod 31 which extends to the middle of the back of the hopper and is attached to a handle 32. This handle 32 is operable on a U-shaped element 33 and is adapted to be locked in either of its two positions by a lug 34, that is to say, in such positions that the clutch will be engaged or disengaged. It will thus be seen that upon the advance of the device and the rotation of the wheels 3 the agitator may be rotated when the clutch members are interengaged or may be permitted to remain stationary when the clutch members are disengaged.

In order that the material may be spread as it passes through the bottom of the hopper, I have provided a spreader which consists of a bar 35 having a plurality of spaced fingers 36 secured thereto, which fingers extend inwardly beneath the opening in the bottom of the hopper and are supported at their ends by an extended side 37 of the hopper, as illustrated in Fig. 6. This bar 35 is provided at its ends with rods 38 which pass through bearing members 39 and are slidable longitudinally therethrough. These bearing members are suitably supported on a bar 40 which is in turn supported by the hopper. It will be seen that the fingers 26 extending into the lower end of the hopper divide the opening at the bottom of the hopper into a plurality of smaller openings which vary their position upon the reciprocation of the spreader. This spreader is actuated, with the rods 38 moving longitudinally in the bars 39, by means of a pitman 41, which is secured to an eccentric 42 at 43. This eccentric is carried by the lower end of a vertical shaft 44, which is supported by brackets 45 extending from the hopper and is at its upper end provided with a pinion 46. This pinion 46 meshes with a similar pinion 47 which is, however, carried by a horizontal shaft 48, the latter being supported in a bearing 49 which extends from the adjacent end of the hopper. On the other end of this shaft a pinion 50 is shown which meshes with a pinion 51 which is rigidly associated with the adjacent wheel 3. Thus upon the movement of the distributer and the rotation of the wheel just referred to, the eccentric 42 will be actuated through the train of gearing, just described, and through the pitman 41 will cause a reciprocation of the spreader, the line of reciprocation being transversely to the direction of movement of the distributer.

A pair of pivoted and freely swinging aprons 52 are located beneath the hopper opening and direct the material which passes therefrom in a downward direction.

From the foregoing description, it will be seen that when the device is attached to a wagon by the brackets 53, or is otherwise drawn forwardly, and the clutch member 28 is in engagement with the clutch member on the gear 27, the movement of the device will cause the rotation of the agitator within the hopper and the result will be the downward feeding of the material. At the same time the movement of the device will cause the transverse reciprocation of the spreader, so that the material which passes from the bottom of the hopper will be thoroughly spread over the ground as it drops thereto, the spreading being accomplished by the fingers 36 which form a part of the spreader. Furthermore, the fact that the slide 8 is adjustable and is provided with means for locking it in its adjusted positions is a big factor, inasmuch as it regulates the amount of material which passes from the hopper and which is spread over the ground.

What I claim is:—

1. A distributer comprising a hopper having an open lower end, a plurality of transversely reciprocatory fingers extending into the open end of the hopper, said fingers having slots therein through which the material from the hopper passes, and means for varying the effective sizes of said slots.

2. A distributer comprising a hopper having an open lower end, a stationary lip at one side of said open end, a plurality of transversely reciprocatory fingers extending into the hopper and resting on the lip, and an agitator located immediately above the fingers to force the material from the hopper through the spaces between the fingers.

3. A distributer comprising a hopper having an open lower end, a slide for varying the size of the opening, a shaft rotatable on, but movable with the slide, a pinion on the shaft, a rack on the hopper with which said pinion engages, and means for locking the shaft against rotation.

4. A distributer comprising a hopper having an open lower end, a slide for varying the size of the opening, a shaft rotatable on, but movable with the slide, a pinion on the shaft, a rack on the hopper with which said pinion engages, and means for locking the shaft against rotation, said means including an apertured lug on the slide and a pin adapted to pass through the shaft and into the aperture in the lug.

In testimony whereof I affix my signature.

GUSTAV AUGUST MEYERS.

Copies of this patent may be obtained for five cents each, by addressing the "Commissioner of Patents, Washington, D. C."